(12) United States Patent
Kuriyama et al.

(10) Patent No.: US 6,865,029 B2
(45) Date of Patent: Mar. 8, 2005

(54) IMAGING DEVICE AND METHOD FOR PRODUCING THE SAME

(75) Inventors: Akihiko Kuriyama, Nara (JP); Kiyoshi Kumata, Kyoto (JP); Noritoshi Kako, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/068,146

(22) Filed: Feb. 6, 2002

(65) Prior Publication Data

US 2002/0109772 A1 Aug. 15, 2002

(30) Foreign Application Priority Data

Feb. 9, 2001 (JP) ........................................ 2001-034690

(51) Int. Cl.⁷ .............................................. G02B 17/00
(52) U.S. Cl. ...................... 359/726; 359/725; 359/727
(58) Field of Search ................................ 359/868, 725, 359/591, 592, 597, 726, 727, 840

(56) References Cited

U.S. PATENT DOCUMENTS

| | | | | |
|---|---|---|---|---|
| 4,566,763 A | | 1/1986 | Greguss | 350/441 |
| 4,986,641 A | * | 1/1991 | Braat | 123/406.51 |
| 5,745,286 A | * | 4/1998 | Hawryluk | 359/359 |
| 6,157,018 A | | 12/2000 | Ishiguro et al. | 250/208.1 |
| 6,169,637 B1 | * | 1/2001 | Tsunashima | 359/726 |
| 6,424,377 B1 | * | 7/2002 | Driscoll et al. | 348/335 |
| 6,426,774 B1 | * | 7/2002 | Driscoll et al. | 348/335 |
| 6,480,229 B1 | * | 11/2002 | Driscoll et al. | 348/335 |

FOREIGN PATENT DOCUMENTS

| | | |
|---|---|---|
| JP | 04-146394 | 5/1992 |
| WO | WO 97/50252 | 12/1997 |
| WO | WO 00/41024 | 7/2000 |

OTHER PUBLICATIONS

European Search Report mailed Feb. 12, 2004 (3 pp.) for corresponding application No. 02250844.4–2217.
Korean Intellectual Property Office, Office Action, dated Apr. 27, 2004, (2 pps.).

* cited by examiner

*Primary Examiner*—Drew A. Dunn
*Assistant Examiner*—Joshua L Pritchett
(74) *Attorney, Agent, or Firm*—Edwards & Angell, LLP; David G. Conlin; George W. Hartnell, III

(57) ABSTRACT

An imaging device includes a convex mirror for reflecting incident light representing an object, the convex mirror having a shape of solid of revolution; an imaging mechanism for taking an image represented by reflected light from the convex mirror; and an optical member for guiding the incident light toward the convex mirror and guiding the reflected light toward the imaging mechanism, the optical member being in close-contact with the convex mirror.

29 Claims, 8 Drawing Sheets

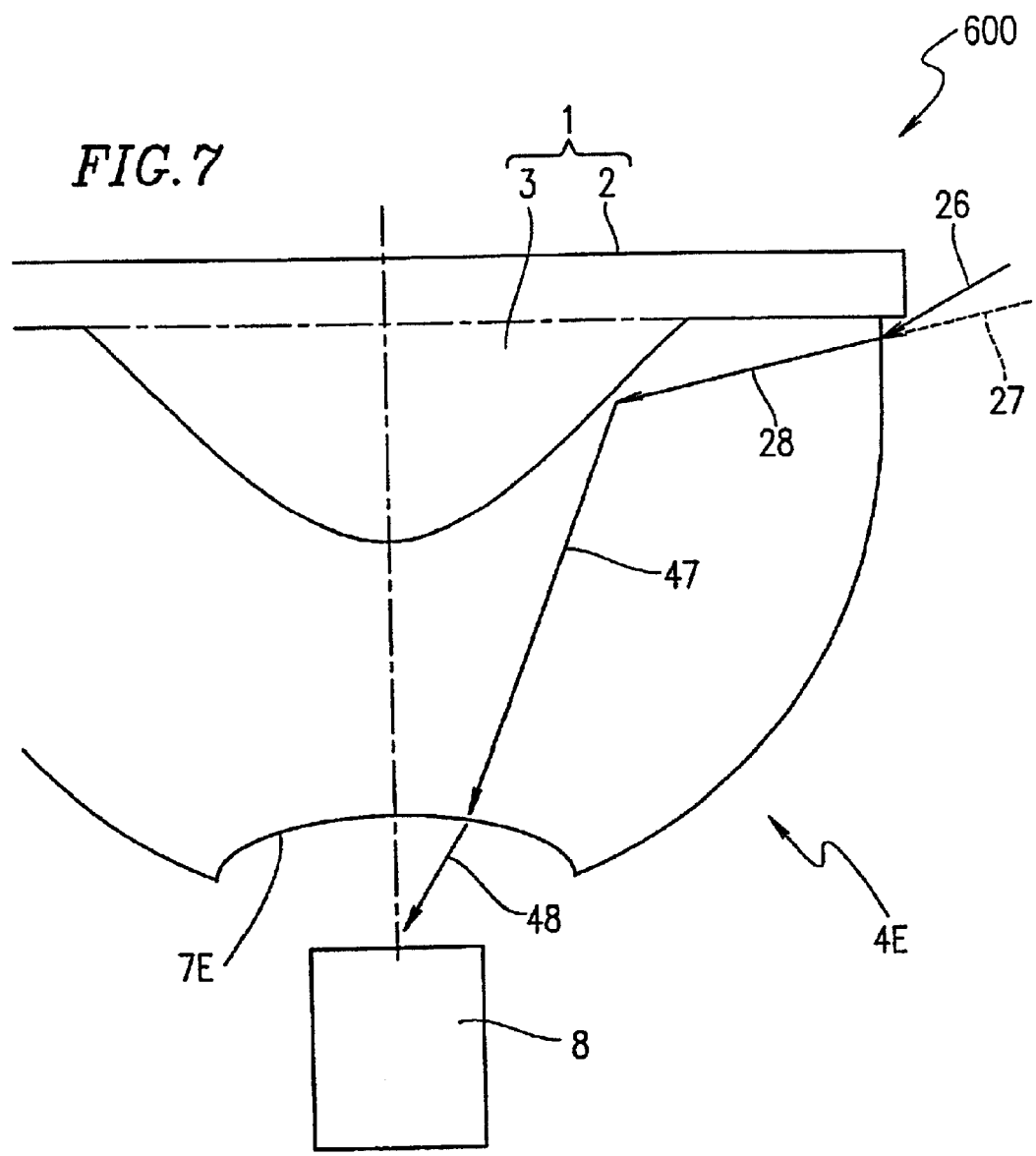

IMAGING DEVICE AND METHOD FOR PRODUCING THE SAME

BACKGROUND OF THE INVENTION

1. Field of the Invention

The present invention relates to an imaging device capable of imaging objects in the omniazimuthal angle of 360 degrees and used in the fields of visual systems such as, for example, surveillance cameras; and a method for producing the same.

2. Description of the Related Art

Recently in the fields of visual systems, such as, for example, surveillance cameras, various attempts have been made to allow a camera to perform monitoring operations conventionally conducted by the human eye, by combining the camera with a computer.

A generally used camera, which has a limited viewing angle, is not suitable for such applications. Therefore, cameras using fish-eye lenses or other wide-angle lenses have been developed. For example, in the field of movable robots, the use of convex mirrors having a shape of solid of revolution (such as conical mirrors), spherical mirrors or the like, have been actively studied. (Hereinafter, such convex mirrors will be referred to as "convex rotatable mirrors".) According to systems studied in this field, an optical image of a viewing angle of 360 degrees is taken by a convex rotatable mirror, then the optical image is converted into a video image, and the video image is further converted into a desirable image by a computer.

FIG. 8A shows a schematic structure of an imaging device 80 using a conventional convex rotational mirror, and FIG. 8B is a cross-sectional view thereof taken along a plane including the rotation axis of a convex rotational mirror 93 described below.

The imaging device 80 includes a convex rotational mirror unit 91. The convex rotational mirror unit 91 includes a generally disc-shaped base 92 and the generally conical convex rotational mirror 93. The imaging device 80 further includes a generally cup-shaped, spherical optical member 94. The optical member 94 is open toward the convex rotational mirror unit 91 and covers a surface of the base 92 and the convex rotational mirror 93. The optical member 94 holds the convex rotational mirror unit 91 and is formed of a light-transmissive material. An inner circumferential surface of the optical member 94 and the convex rotational mirror 93 interpose a hollow space therebetween. The optical member 94 has a thickness which is sufficiently thin to allow light which is incident on an outer circumferential surface of the optical member 94 to be transmitted through the optical member 94, so that it is proximately parallel to light which is directed toward the convex rotational mirror 93 from the inner circumferential surface of the optical member 94.

A generally cylindrical imaging mechanism 98 is provided on the opposite side to the convex rotational mirror unit 91, with the optical member 94 interposed therebetween. The imaging mechanism 98 is able to be engaged with the optical member 94. The imaging mechanism 98 includes a lens 99 facing an opening of the optical member 94, which is formed on the opposite side to the convex rotational mirror unit 91, and an imaging section 90 provided on the opposite side to the optical member 94, with the lens 99 interposed therebetween. The imaging section 90 is connected to a signal processing section 88 provided for adjusting the distortion of an image taken by the imaging mechanism 98.

As described above, the light-transmissive optical member 94 is used for holding the convex rotational mirror unit 91, and thus a separate holding member is not provided. The reason is that if a separate holding member is provided for holding the convex rotational mirror unit 91, an image of the holding member itself would be taken and so would be a part of an image taken by the imaging mechanism 98.

As the convex rotational mirror 93, a mirror which reflects incident light at a surface thereof is used so that an image formed by the reflection does not overlap the image that is intended to be taken. The convex rotational mirror 93 is formed of a metal material. Alternatively, the convex rotational mirror 93 may have a metal material, for example, vapor-deposited or plated onto an outer circumferential surface thereof.

The imaging device 80 having the above-described structure operates as follows.

Light 71 is incident on the outer circumferential surface of the light-transmissive optical member 94 and is transmitted through the optical member 94. While being transmitted through the optical member 94, the incident light 71 is refracted twice (not shown) so as to become light 72. The light 72 is directed from the inner circumferential surface of the optical member 94 toward the convex rotational mirror 93 through the hollow space between the optical member 94 and the convex rotational mirror 93. Then, the light 72 is reflected by the convex rotational mirror 93 and is directed toward the imaging mechanism 98 as reflected light 81. The reflected light 81 is transmitted through the lens 99 of the imaging mechanism 98 and incident on the imaging section 90. The imaging section 90 transforms the reflected light 81 into an image signal representing an image and outputs the image signal to the signal processing section 88. The signal processing section 88 processes the received image signal so as to adjust the distortion of the image.

The conventional imaging device 80 has the following problems.

(1) An outer surface of the convex rotational mirror 93 is exposed to the air filling the hollow space between the optical member 94 and the convex rotational mirror 93. Therefore, the metal on the surface of the convex rotational mirror 93 is oxidized, or the metal material vapor-deposited or plated onto the surface of the convex rotational mirror 93 is exfoliated. As a result, the reflectance of the light incident on the convex rotational mirror 93 is lowered.

(2) Dust, moisture or the like which invades into the hollow space between the optical member 94 and the convex rotational mirror 93 through the gap between the base 92 and the optical member 94, causes noise to the light 72 and the reflected light 81. Therefore, the quality of the image taken by the imaging mechanism 98 is degraded.

When the imaging device 80 having the above-described problem is used outdoors or the like for an extended period of time, external factors such as temperature, moisture, ultraviolet rays or the like cause the following problems. The metal material of the convex rotational mirror 93 is oxidized and thus corroded. When the metal material is vapor-deposited or plated onto the surface of the convex rotational mirror 93, such metal material is exfoliated or corroded. It is necessary to prevent exfoliation and corrosion of the metal material and also to prevent dust or moisture from entering the connection part of the optical member 94 and the convex rotational mirror 93.

(3) The optical member 94 is hollow and therefore is mechanically weak and easy to break. In actual use, specific care needs to be taken to avoid breakage.

SUMMARY OF THE INVENTION

According to one aspect of the invention, an imaging device includes a convex mirror for reflecting incident light representing an object, the convex mirror having a shape of solid of revolution an imaging mechanism for taking an image represented by reflected light from the convex mirror; and an optical member for guiding the incident light toward the convex mirror and guiding the reflected light toward the imaging mechanism, the optical member being in close-contact with the convex mirror.

In one embodiment of the invention, the optical member has a concave portion which is in close-contact with the convex mirror so as to cover the convex mirror.

In one embodiment of the invention, the convex mirror is formed of a thin layer of a material having a mirror-surface effect, the thin layer being provided on the concave portion.

In one embodiment of the invention, the convex mirror is formed of a metal material.

In one embodiment of the invention, the convex mirror is formed of aluminum.

In one embodiment of the invention, the convex mirror is formed as a result of vapor-deposition, sputtering or plating of a material having a mirror-surface effect.

In one embodiment of the invention, the imaging mechanism includes a lens for converging the reflected light, and an imaging section for taking an image represented by the reflected light converged by the lens; and the lens is integrally formed with the optical member.

In one embodiment of the invention, the imaging mechanism includes a lens for converging the reflected light, and an imaging section for taking an image represented by the reflected light converged by the lens; and the lens is in close-contact with the optical member.

In one embodiment of the invention, the optical member has a refractive index which is smaller than the refractive index of the lens.

In one embodiment of the invention, the optical member has an outer circumferential surface formed so as to cause the incident light to be incident thereon in a direction normal to the outer circumferential surface.

In one embodiment of the invention, the optical member has a reflected light releasing face formed so as to cause the reflected light directed toward the imaging mechanism to be incident thereon in a direction normal to the reflected light releasing face.

In one embodiment of the invention, the reflected light releasing face is a part of a surface of a circle having, as the center, a focal point at which the reflected light is converged.

According to another aspect of the invention, a method for producing the above-described imaging device includes the steps of causing the optical member to be in close-contact with the convex mirror so that the optical member covers the convex mirror; and attaching the imaging mechanism to the optical member so that the reflected light is incident on the imaging mechanism.

Hereinafter, the function of the present invention will be described.

According to the present invention, the optical member formed of a light-transmissive material is provided in close-contact with a surface of the convex rotational mirror, so as to cover the convex rotational mirror. Therefore, even when the imaging device is subjected to external heat, ultraviolet rays or the like, the surface of the convex rotational mirror is not deteriorated due to oxidation or the like, nor is the vapor-deposited or plated metal material exfoliated. Thus, the reflectance of the convex rotational mirror is not reduced. Since the optical member is provided in close-contact with the convex rotational mirror so as to cover the convex rotational mirror, dust, moisture or the like can be prevented from entering between the convex rotational mirror and the optical member. As a result, noise to the light incident on the convex rotational mirror or noise to the light reflected by the convex rotational mirror is not generated. The structure of the optical member in close-contact with the convex rotational mirror also increases the mechanical strength of the optical member compared to the conventional structure having the hollow optical member, thus providing a wider viewing angle.

In a structure where the optical member is formed of a material having a smaller refractive index than that of the lens, the optical member need not be formed of a material having a large refractive index and thus need not be expensive, as described below in a second example of the present invention.

In a structure where the optical member and the lens are formed of the same material, the optical member and the lens can be integrally formed. Therefore, the adjustment of the lens with respect to the optical member is not necessary and the number of components of the optical system can be reduced, as described below in a first example of the present invention.

In a structure where the reflected light releasing face of the optical member is formed so as to cause the reflected light directed toward the imaging mechanism to be incident thereon in a direction normal to the reflected light releasing face, the optical system can be easily designed as described below in a third example of the present invention (FIGS. 5 and 6). In the case where the reflected light is designed to be converged on a prescribed focal point, the reflected light releasing face may be formed so as to be a part of the surface of a circle having the focal point as the center.

In a structure where a thin layer of a material having a mirror-surface effect is provided on the concave portion of the optical member, the thin layer acts as a convex rotational mirror. In this case, the convex rotational mirror and the optical member can be integrally produced and the size of the imaging device is reduced. The production process of the imaging device is also simplified.

The convex rotational mirror may be formed of a convex surface of a member formed of a metal material.

Aluminum, silver, platinum, a nickel-chromium alloy, gold and the like are suitable metal materials for producing a mirror-surface effect. Aluminum is optimum to reduce the cost of the imaging device.

Thus, the invention described herein makes possible the advantages of providing (1) an imaging device for preventing reduction in the reflectance of light incident on a convex rotational mirror, and a method for producing the same; and (2) an imaging device for preventing dust, moisture or the like from entering between a convex rotational mirror and an optical member, and a method for producing the same.

These and other advantages of the present invention will become apparent to those skilled in the art upon reading and understanding the following detailed description with reference to the accompanying figures.

BRIEF DESCRIPTION OF THE DRAWINGS

FIG. 7 shows a schematic structure of another imaging device according to the third example of the present invention.

DESCRIPTION OF THE PREFERRED EMBODIMENTS

Hereinafter, the present invention will be described by way of illustrative examples with reference to the accompanying drawings.

EXAMPLE 1

Figure 1A:
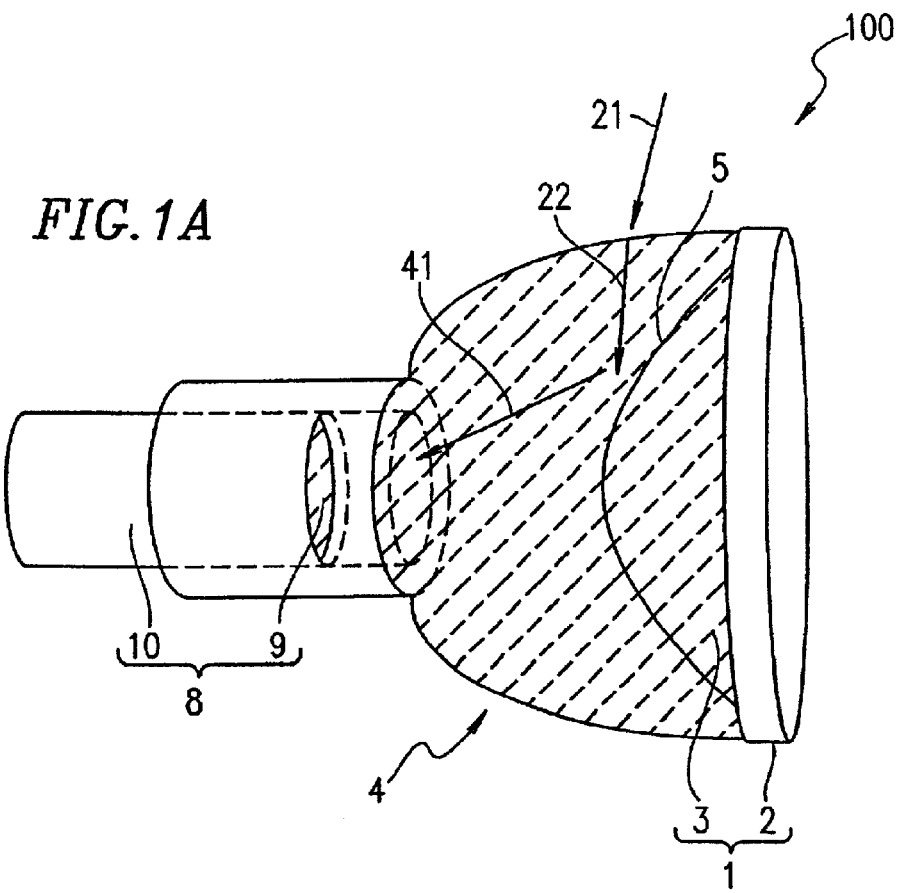
FIG. 1A shows a schematic structure of an imaging device according to a first example of the present invention.
Figure 1B:
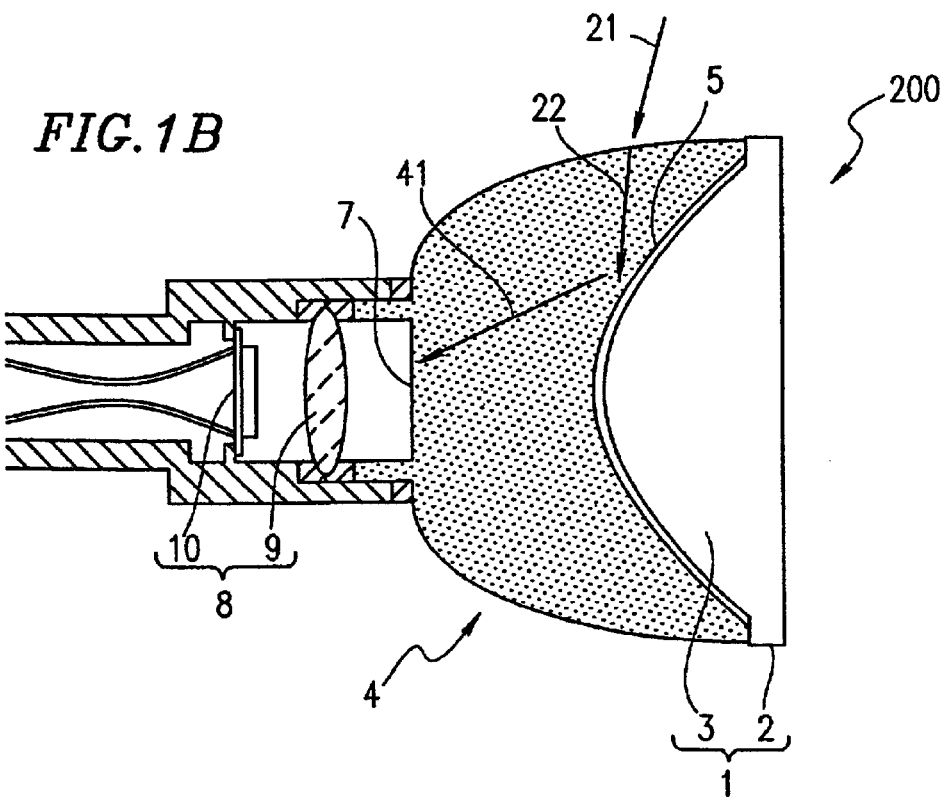
FIG. 1B is a cross-sectional view thereof.

FIG. 1A shows a schematic structure of an imaging device 100 according to a first example of the present invention, and FIG. 1B is a cross-sectional view thereof taken along a plane including the rotation axis of a convex rotational mirror 3 described below.

The imaging device 100 includes a convex rotational mirror unit 1. The convex rotational mirror unit 1 includes a generally disc-shaped base 2 and the convex rotational mirror 3 provided on a surface of the base 2. The convex rotational mirror 3 has a rotational shape having a rotation axis which is vertical to the surface of the base 2. A surface of the convex rotational mirror 3 is, for example, hyperboloidal. Alternatively, the surface of the convex rotational mirror 3 may be hemispherical or conical.

The convex rotational mirror 3 is formed of a metal material such as, for example, aluminum or stainless steel. Alternatively, the convex rotational mirror 3 may have a material having a mirror-surface effect such as, for example, aluminum, silver, platinum, a nickel-chromium alloy or gold, vapor-deposited, sputtered or plated onto the surface thereof.

Figure 8A:
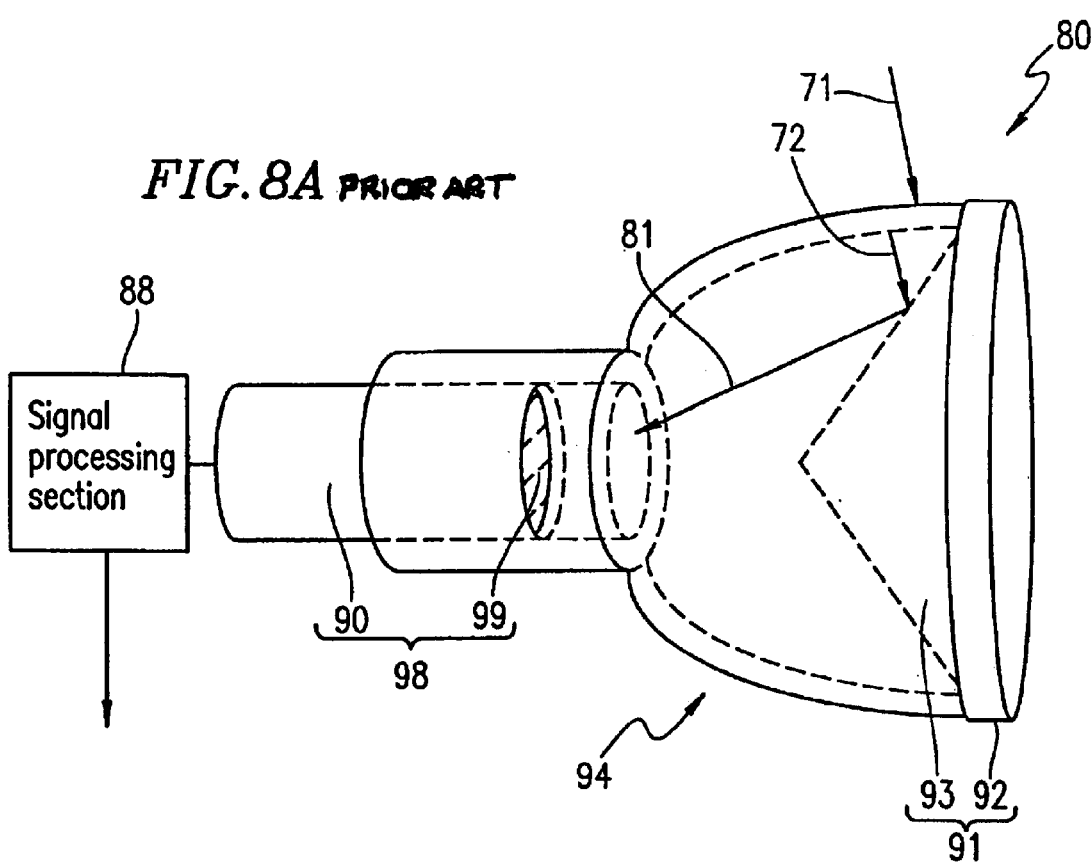
FIG. 8A shows a schematic structure of a conventional imaging device.
Figure 8B:
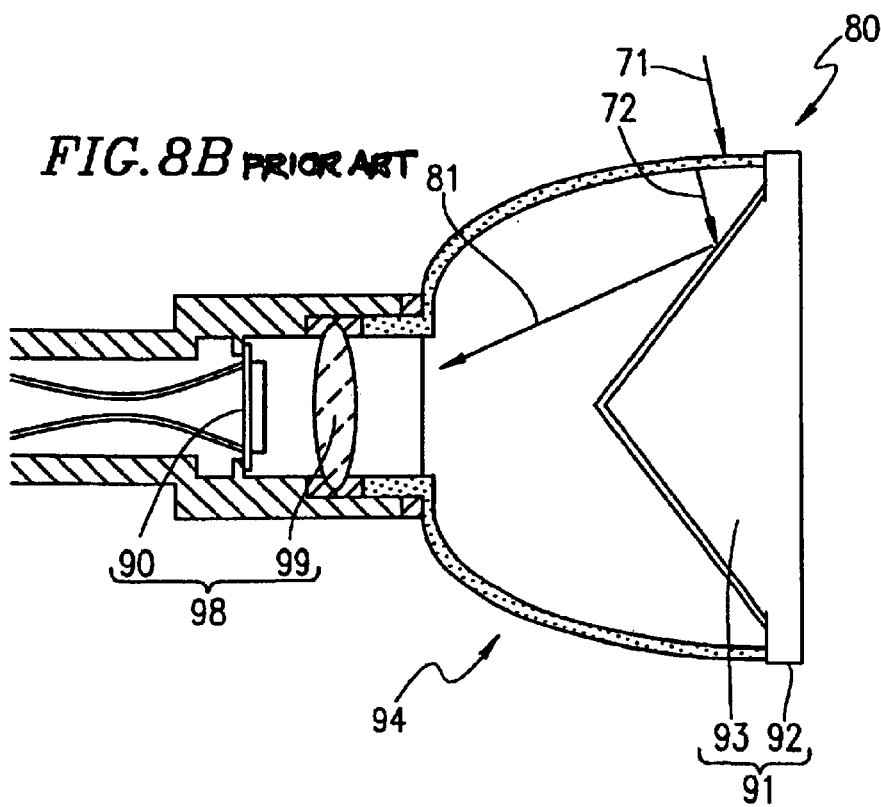
FIG. 8B is a cross-sectional view thereof.

The imaging device 100 further includes an optical member 4 so as to cover the surface of the base 2 and the convex rotational mirror 3. A surface of the optical member 4 facing the convex rotational mirror unit 1 has a concave portion 5 having a curved surface projecting in an opposite direction to the base 2. The optical member 4 is formed of, for example, a light-transmissive and non-moisture permeable resin such as an acrylic resin, polycarbonate, or the like, or glass. The optical member 4 is formed so as to be in close-contact with the convex rotational mirror 3 along the concave portion 5, unlike in the conventional imaging device 80 described above with reference to FIGS. 8A and 8B which have a hollow space between the optical member 94 and the convex rotational mirror 93.

The optical member 4 preferably has a rotational shape with a rotation axis that matches the rotation axis of the convex rotational mirror 3. The reason for this is because where the optical member 4 and the convex rotational mirror 3 have matching rotation axes, the optical path length from an outer circumferential surface of the optical member 4 to a surface of the convex rotational mirror 3 is equal over the omniazimuthal angle of 360 degrees. This facilitates a processing operation of an image signal obtained based on light which is reflected by the convex rotational mirror 3 and represents an image of an object.

The imaging device 100 further includes a generally cylindrical imaging mechanism 8 on the opposite side to the convex rotational mirror unit 1, with the optical member 4 interposed therebetween. The imaging mechanism 8 includes a lens 9 facing a reflected light releasing face 7 of the optical member 4, which is formed on the opposite side to the convex rotational mirror unit 1. The lens 9 is located so that an optical axis thereof matches the rotation axis of the convex rotational mirror 3. The lens 9 converges light which is reflected by the convex rotational mirror 3. The imaging mechanism 8 also includes an imaging section 10 provided on the opposite side to the optical member 4 with the lens 9 interposed therebetween. The imaging section 10 is formed of a CCD or the like. The imaging section 10 generates an image signal representing an image based on the reflected light converged by the lens 9, and outputs the image signal to a signal processing section (not shown). The signal processing section adjusts the distortion of the image signal which is output from the imaging section 10.

The imaging device 100, having the above-described structure, operates as follows.

Light 21 is incident on the outer circumferential surface of the optical member 4. The incident light 21 is refracted by the outer circumferential surface of the optical member 4 so as to become light 22. The light 22 passes through the optical member 4 and reaches the convex rotational mirror 3 which is in close-contact with the optical member 4.

The light-transmissive resin, such as an acrylic resin, polycarbonate or the like, or glass that is used to form the optical member 4, has a refractive index which is larger than that of air at room temperature. For example, a light-transmissive resin has a refractive index of 1.49 to 1.71, and glass has a refractive index of 1.52 to 1.90. Therefore, the viewing angle of the imaging device 100 is wider than that of the conventional imaging device 80 (FIGS. 8A and 8B) having a hollow space filled with air between the optical member 94 and the convex rotational mirror 93.

The light 22 incident on the convex rotational mirror 3 is reflected by the surface of the convex rotational mirror 3 so as to become reflected light 41. The reflected light 41 passes through the reflected light releasing face 7 of the optical member 4 and is converged by the lens 9 of the imaging mechanism 8. The imaging section 10 generates an image signal which represents an image based on the reflected light 41 converged by the lens 9, and outputs the image signal to the signal processing section (not shown). The signal processing section adjusts the distortion of the image signal which is output from the imaging section 10.

As described above, in the first example of the present invention, the optical member 4 is in close-contact with the convex rotational mirror 3. Therefore, there is no air or moisture existing between the optical member 4 and the convex rotational mirror 3, unlike the conventional imaging device 80 described above with reference to FIGS. 8A and 8B. Due to such a structure, the surface of the convex rotational mirror 3 is prevented from being corroded by moisture or air.

In an alternative structure, a thin layer of a material having a mirror-surface effect may be formed on a surface of the concave portion 5 of the optical member 4, instead of the convex rotational mirror unit 1 being provided. The light 22 is reflected by the thin layer. Such an alternative structure can reduce the size of the imaging device and simplify the production process of the imaging device. In addition, a layer of a resin or other light-transmissive materials may be formed on a surface of the thin layer opposite to the surface reflecting the light 22. Thus, the deterioration of the optical member 4 caused by oxidation or the like can be avoided. The convex rotational mirror 3 and the optical member 4 may be produced separately.

Figure 2A:
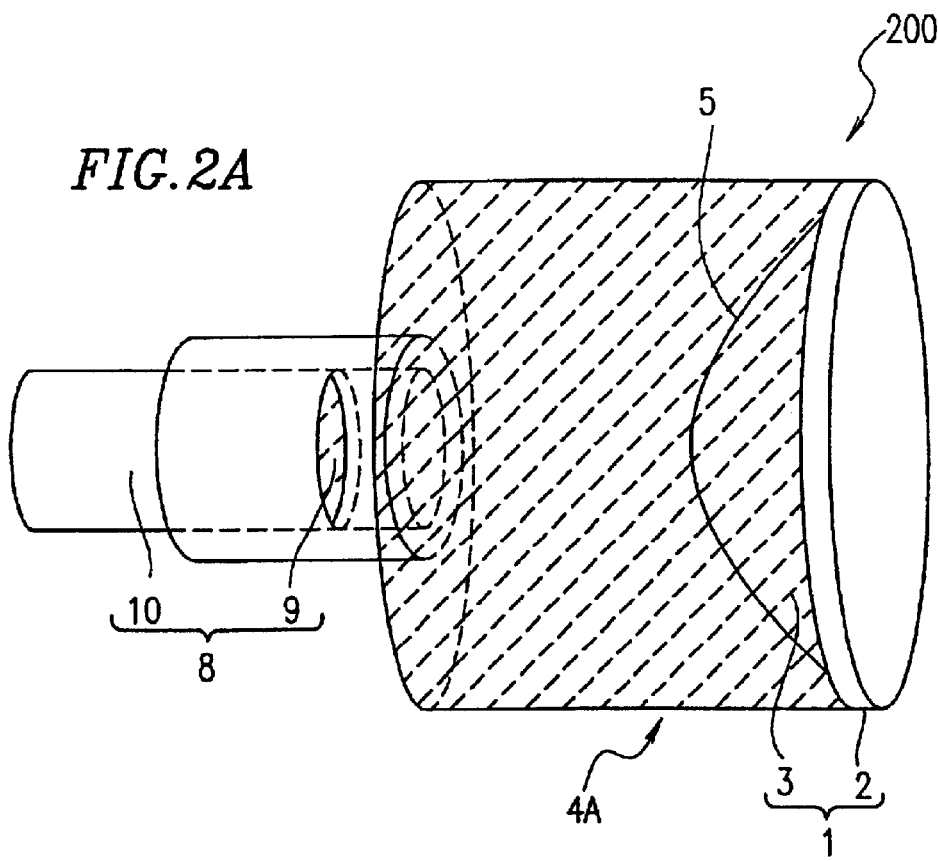
FIG. 2A shows a schematic structure of another imaging device according to the first example of the present invention.
Figure 2B:
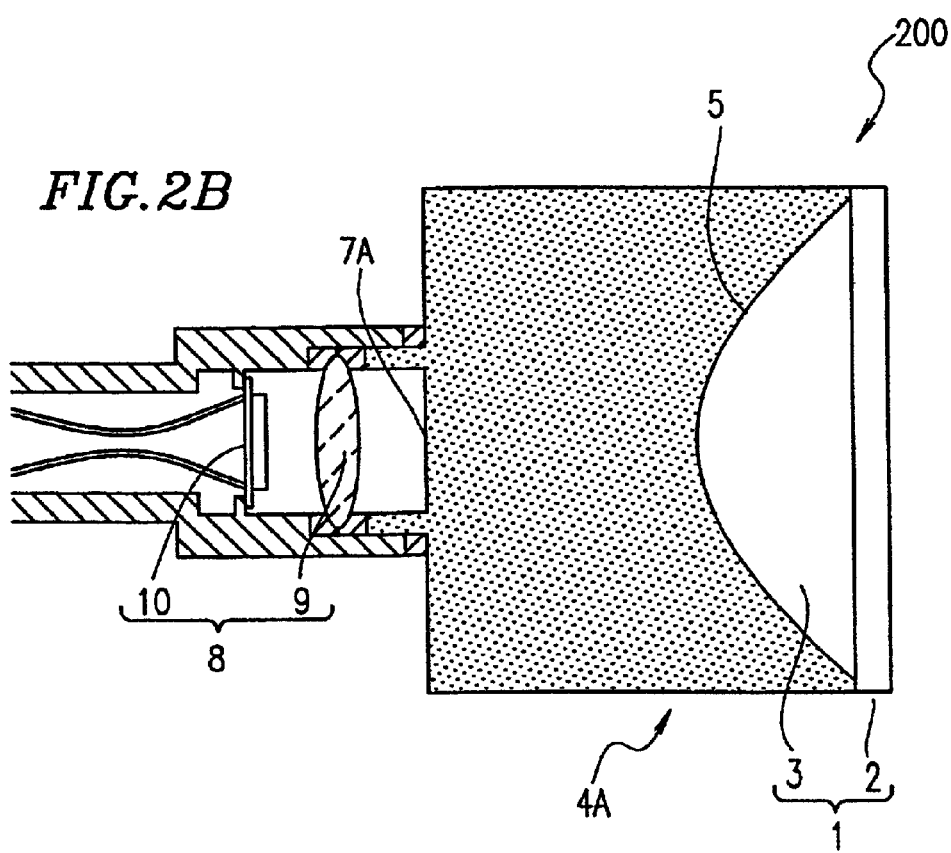
FIG. 2B is a cross-sectional view thereof.

FIG. 2A shows a schematic structure of another imaging device 200 according to the first example of the present invention, and FIG. 2B is a cross-sectional view thereof taken along a plane including the rotation axis of the convex rotation mirror 3. Identical elements described above referring to FIGS. 1A and 1B bear identical reference numerals therewith and detailed descriptions thereof will be omitted.

As shown in FIGS. 2A and 2B, the imaging device 200 includes an optical member 4A which is generally cylindrical. Such a structure provides an effect substantially the same as that of the imaging device 100.

Figure 3A:
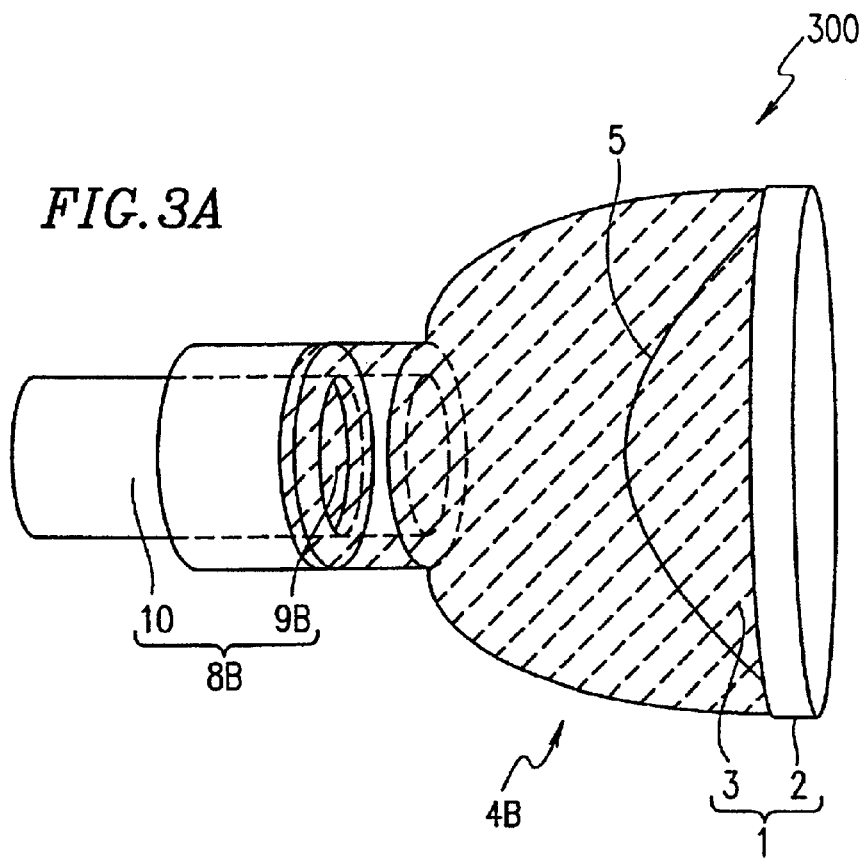
FIG. 3A shows a schematic structure of still another imaging device according to the first example of the present invention.
Figure 3B:
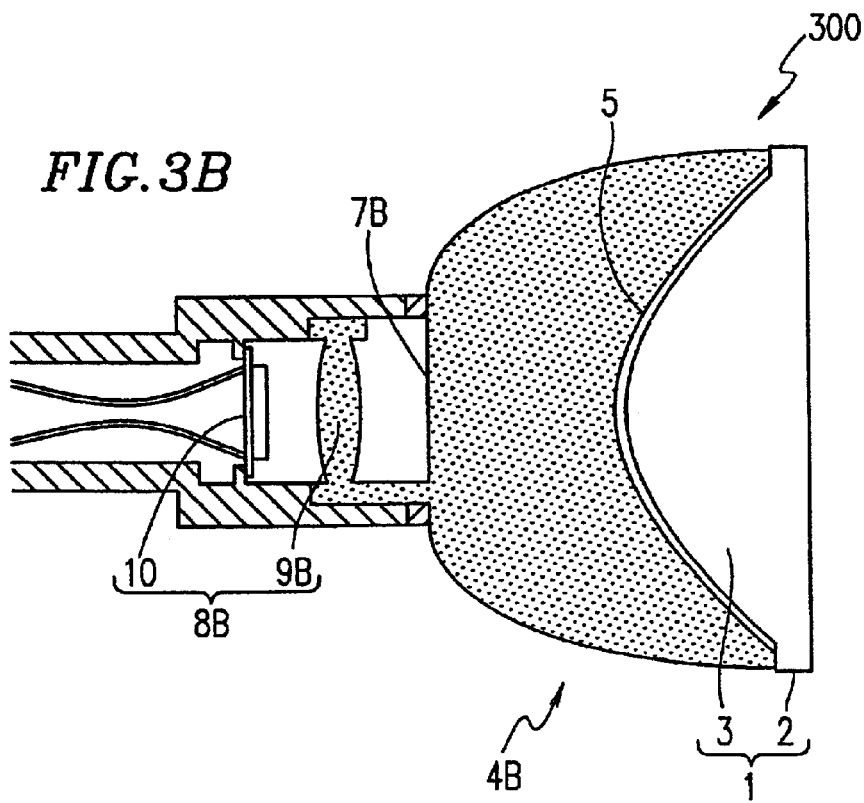
FIG. 3B is a cross-sectional view thereof.

FIG. 3A shows a schematic structure of still another imaging device 300 according to the first example of the present invention, and FIG. 3B is a cross-sectional view thereof taken along a plane including the rotation axis of the convex rotation mirror 3. Identical elements described above referring to FIGS. 1A and 1B bear identical reference numerals therewith and detailed descriptions thereof will be omitted.

As shown in FIGS. 3A and 3B, the imaging device 300 includes an optical member 4B which is integrally formed with a lens 9B included in an imaging mechanism 8B.

Where the optical member 4B is integrally formed with the lens 9B, the following advantages are provided. By designing and producing the lens 9B in terms of shape and position with respect to the optical member 4B in advance, the production process can exclude the step of adjusting the position of the lens 9B with respect to the optical member 4, and also the number of components of the optical system can be reduced. Thus, the production efficiency is improved.

The imaging devices 100, 200 and 300 also have the advantage of a higher mechanical strength since the optical members 4, 4A and 4B are solid inside.

EXAMPLE 2

Figure 4A:
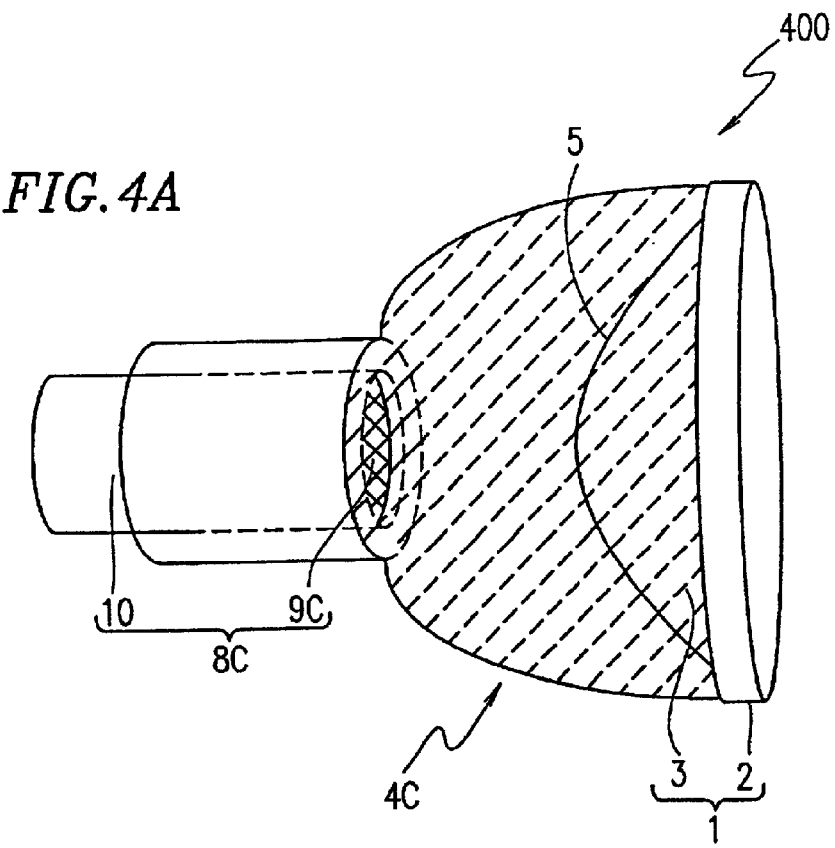
FIG. 4A shows a schematic structure of an imaging device according to a second example of the present invention.
Figure 4B:
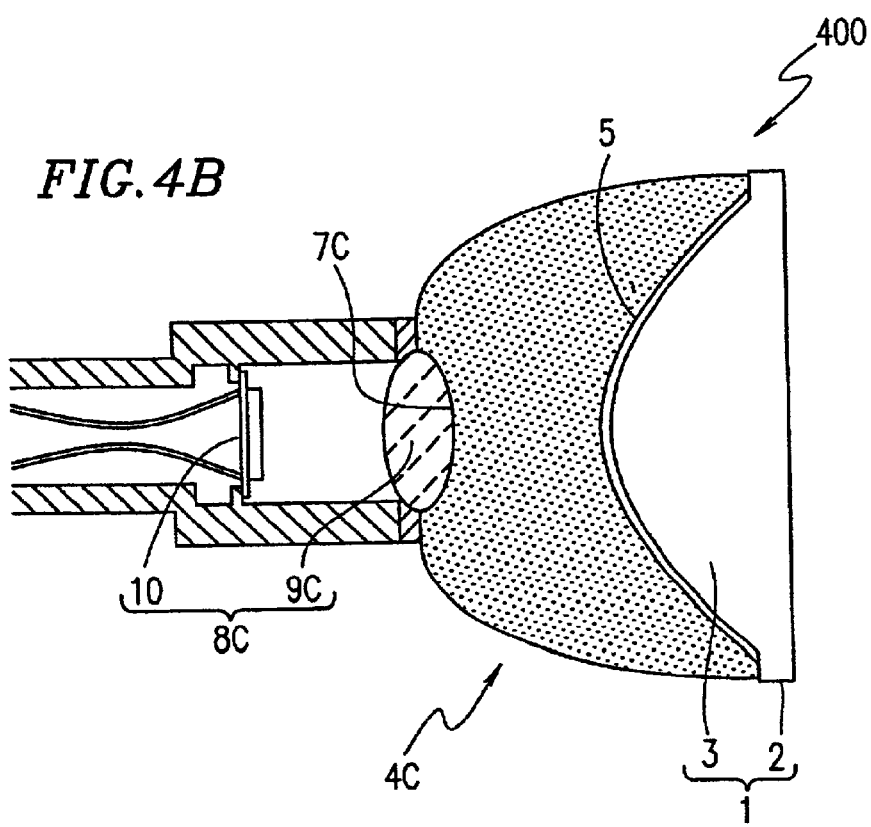
FIG. 4B is a cross-sectional view thereof.

FIG. 4A shows a schematic structure of an imaging device 400 according to a second example of the present invention, and FIG. 4B is a cross-sectional view thereof taken along a plane including the rotation axis of a convex rotational mirror 3. Identical elements described above referring to FIGS. 1A and 1B bear identical reference numerals therewith and detailed descriptions thereof will be omitted.

An imaging device 400 includes an optical member 4C. The optical member 4C has a reflected light releasing face 7C on the opposite side to the convex rotational mirror unit 1. The reflected light releasing face 7C has a curved surface which projects toward the convex rotational mirror 3. The optical member 4C is formed of a light-transmissive material.

A generally cylindrical imaging mechanism 8C is provided on the opposite side to the convex rotational mirror unit 1 with the optical member 4C interposed therebetween. The imaging mechanism 8C covers the reflected light releasing face 7C of the optical member 4C. The imaging mechanism 8 includes a lens 9C. The lens 9C is in close-contact with the reflected light releasing face 7C. The lens 9C is formed of a light-transmissive material. The light-transmissive material used to form the lens 9C has a refractive index which is larger than that of the light-transmissive material used to form the optical member 4C. The light-transmissive material used to form the lens 9C is, for example, lead glass having a refractive index of 1.92 or diamond having a refractive index of 2.42.

The imaging device 400, having the above-described structure, operates as follows.

Light, which is incident on an outer circumferential surface of the optical member 4C, is refracted by the outer circumferential surface, passes through the optical member 4C and is directed to the convex rotational mirror 3 which is in close-contact with the optical member 4C. The light incident on the convex rotational mirror 3 is reflected by a surface of the convex rotational mirror 3 and passes through the reflected light releasing face 7C of the optical member 4C as reflected light, so as to be directly incident on the lens 9C, which is in close-contact with the reflected light releasing face 7C. The reflected light is then converged by the lens 9C.

The imaging section 10 generates an image signal which represents an image based on the reflected light converged by the lens 9C, and outputs the image signal to the signal processing section (not shown). The signal processing section adjusts the distortion of the image signal which is output from the imaging section 10.

As described above, the lens 9C is in close-contact with the optical member 4C. Therefore, the light reflected by the convex rotational mirror 3 is incident on the lens 9C from the reflected light releasing face 7C directly, instead of through the air layer, as in the imaging device 100 (FIGS. 1A and 1B), formed between the reflected light releasing face 7 and the lens 9. The refractive index of the optical member 4C, having the reflected light releasing face 7C in the imaging device 400, is larger than the refractive index of the air layer in the imaging device 100. Therefore, the curvature of the lens 9C directly receiving the incident light from the reflected light releasing face 7C needs to be larger than that of the lens 9 receiving the incident light through the air layer. This is why the lens 9C is formed of lead glass, diamond or the like, which have a relatively large refractive index. Since a material possessing a larger refractive index is relatively expensive, the optical member 4C is formed of a material having a small refractive index and thus is relatively inexpensive.

Where the reflected light releasing face 7C of the optical member 4C is in close-contact with the lens 9C of the imaging mechanism 8C, the following advantages are provided, which are similar to those of the imaging device 300, described above with reference to FIGS. 3A and 3B. By designing and producing the lens 9C in terms of shape and position, with respect to the optical member 4C in advance, the production process can exclude the step of adjusting the position of the lens 9C with respect to the optical member 4C, and also the number of components of the optical system can be reduced. Thus, the production efficiency is improved.

EXAMPLE 3

Figure 5:
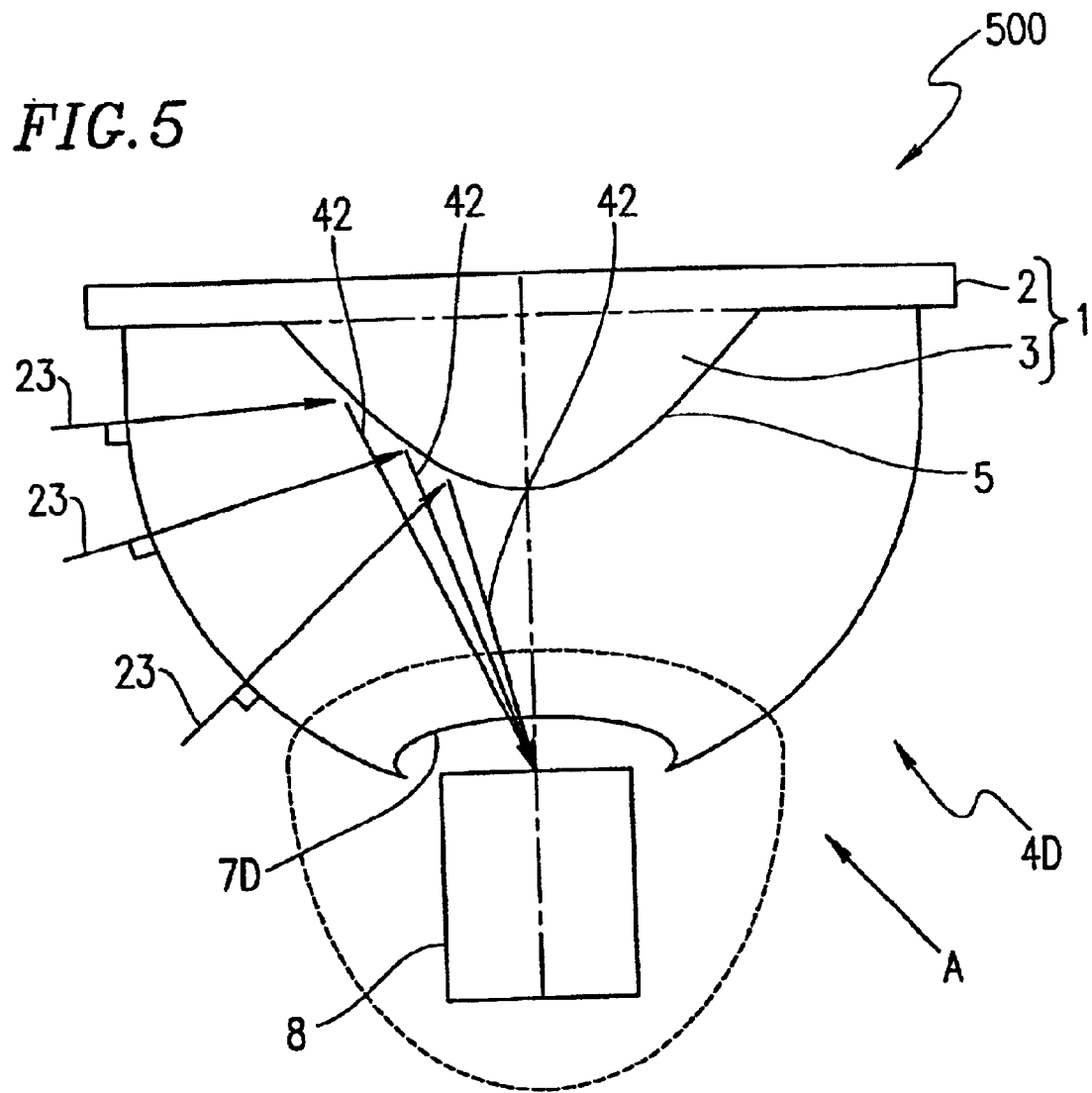
FIG. 5 shows a schematic structure of an imaging device according to a third example of the present invention.
Figure 6:
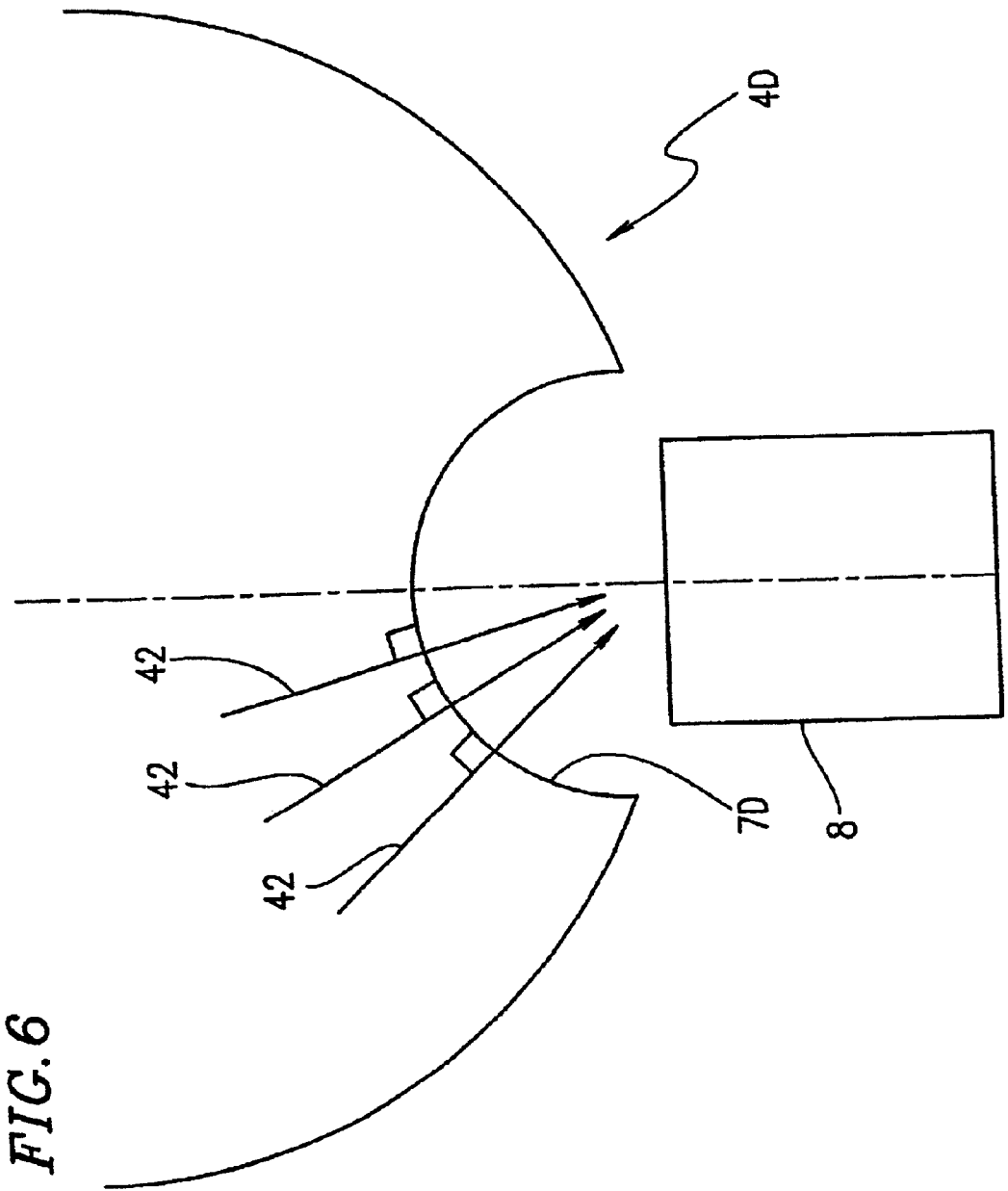
FIG. 6 shows a structure of the imaging device according to the third example of the present invention.

FIGS. 5 and 6 show a schematic structure of an imaging device 500 according to a third example of the present invention. Identical elements described above referring to FIGS. 1A and 1B bear identical reference numerals therewith and detailed descriptions thereof will be omitted. The imaging device 500 is different from the imaging device 100 (FIGS. 1A and 1B) in that the imaging device 500 includes an optical member 4D instead of the optical member 4.

The optical member 4D has an outer circumferential surface formed so as to cause light to be incident thereon in a direction normal thereto (FIG. 5). The optical member 4D includes a reflected light releasing face 7D formed so as to cause the light reflected by the convex rotational mirror 3 to pass therethrough in a direction normal thereto (FIG. 6).

The imaging device 500, having the above-described structure, operates as follows.

Light 23, incident on the outer circumferential surface of the optical member 4D, advances straight without being refracted by the outer circumferential surface, passes through the optical member 4D and is directed to the convex rotational mirror 3 which is in close-contact with the optical member 4D. The incident light 23 is then reflected by a surface of the convex rotational mirror 3 so as to become reflected light 42. The reflected light 42 passes straight through the reflected light releasing face 7D without being refracted and is converged by a lens (not shown) included in the imaging mechanism 8. An imaging section (not shown) of the imaging mechanism 8 generates an image signal representing an image based on the reflected light 42 converged by the lens, and outputs the image signal to a signal processing section (not shown). The signal processing section adjusts the distortion of the image signal which is output from the imaging section.

As described above, the outer circumferential surface of the optical member 4D is formed so as to cause the light to be incident in a direction normal thereto. Therefore, the incident light 23 advances straight without being refracted by the outer circumferential surface, regardless of the refractive index of the material used to form the optical member 4D. The reflected light releasing face 7D is formed so as to cause light to pass therethrough in a direction normal thereto. Therefore, the reflected light 42 passes straight through the reflected light releasing face 7D without being refracted, regardless of the refractive index of the material used to form the optical member 4D. Accordingly, the optical system can be designed without considering the refractive index of the optical member 4D, with respect to the incident light or the reflected light. Since the material for the optical member 4D can be selected regardless of the refractive index, the optical system can be designed more easily.

In the example shown in FIGS. 5 and 6, the convex rotational mirror 3 is designed so as to converge the reflected light 42 on a prescribed focal point. In this case, the reflected light releasing face 7D may be formed so as to be a part of the surface of a circle having the focal point as the center.

FIG. 7 is a cross-sectional view of another imaging device 600 according to the third example of the present invention. Identical elements described above referring to FIGS. 5 and 6 bear identical reference numerals therewith and detailed descriptions thereof will be omitted. The imaging device 600 is different from the imaging device 500 in that the imaging device 600 includes an optical member 4E instead of the optical member 4D.

The optical member 4E has an outer circumferential surface formed to refract light incident thereon. The optical member 4E includes a reflected light releasing face 7E formed to refract the light reflected by the convex rotational mirror 3.

The imaging device 600, having the above-described structure, operates as follows.

Light 26, incident on the outer circumferential surface of the optical member 4E, is refracted by the outer circumferential surface so as to become light 28. The light 28 passes through the optical member 4E and is directed to the convex rotational mirror 3 which is in close-contact with the optical member 4E. The light 28 is then reflected by a surface of the convex rotational mirror 3 so as to become reflected light 47. The reflected light 47 is refracted by the reflected light releasing face 7E, is transmitted through the air layer between the reflected light releasing face 7E and the imaging mechanism 8 and is converged by a lens (not shown) included in the imaging mechanism 8. An imaging section (not shown) of the imaging mechanism 8 generates an image signal representing an image based on the reflected light 47 converged by the lens, and outputs the image signal to a signal processing section (not shown). The signal processing section adjusts the distortion of the image signal which is output from the imaging section.

In FIG. 7, dashed line 27 represents incident light in the conventional imaging device 80 described above with reference to FIGS. 8A and 8B. In the conventional imaging device 80, the light incident on the optical member 94 and the light directed from the optical member 94 toward the convex rotational mirror 93 are proximately parallel to each other due to the thinness of the hollow optical member 94. Thus, the incident light 27 becomes the light 28. In the imaging device 600 in the third example of the present invention, the light 26 is incident on the optical member 4B reaches the optical member 4B along a path above the path of the light 27. Therefore, the viewing angle of the imaging device 600 is wider than that of the conventional imaging device 80.

Thus, in the structure where the light is refracted by the outer circumferential surface of the optical member 4E, the viewing angle of the imaging device can be enlarged.

In the structure where an outer circumferential surface of the optical member is spherical, i.e., cup-shaped, the influence of the reflected light inside the optical member is eliminated. As a result, a clearer image can be obtained. In the structure where the convex rotational mirror 3 has a hyperboloidal shape, the image data representing the image taken by the imaging mechanism can be easily converted into image data representing a perspective view or a panoramic view.

As described above, the present invention provides an imaging device for preventing reduction in the reflectance of light incident on a convex rotational mirror, and a method for producing the same; and an imaging device for preventing dust, moisture or the like from, entering between a convex rotational mirror and an optical member, and a method for producing the same.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An imaging device, comprising:
   a convex mirror for reflecting incident light representing an object, the convex mirror having a shape of solid of revolution;
   an imaging mechanism for taking an image represented by reflected light from the convex mirror; and an optical member for guiding the incident light toward the convex mirror and guiding the reflected light toward the imaging mechanism, the optical member being in contact with and holding both of the convex mirror and the imaging mechanism disposed on the opposite side to the convex mirror with the optical member interposed therebetween, wherein the optical member holds both of the convex mirror, and the lens of the imaging mechanism without using a separate housing.

2. An imaging device according to claim 1, wherein the optical member has a concave portion which is in close-contact with the convex mirror so as to cover the convex mirror.

3. An imaging device according to claim 2, wherein the convex mirror is formed of a thin layer of a material having a mirror-surface effect, the thin layer being provided on the concave portion.

4. An imaging device according to claim 1, wherein the convex mirror is formed of a metal material.

5. An imaging device according to claim 1, wherein the convex mirror is formed of aluminum.

6. An imaging device according to claim 1, wherein the optical member has a plane for releasing the reflected light, and the plane has a flat surface or a curved surface projecting towards the convex mirror.

7. An imaging device according to claim 1, wherein the imaging mechanism includes a lens for converging the reflected light, and an imaging section for taking an image represented by the reflected light converged by the lens; and the lens is integrally formed with the optical member.

8. An imaging device according to claim 1, wherein the imaging mechanism includes a lens for converging the reflected light, and an imaging section for taking an image represented by the reflected light converged by the lens; and the lens is in close-contact with the optical member.

9. An imaging device according to claim 8, wherein the optical member has a refractive index which is smaller than the refractive index of the lens.

10. An imaging device according to claim 1, wherein the optical member has an outer circumferential surface formed so as to cause the incident light to be incident thereon in a direction normal to the outer circumferential surface.

11. An imaging device according to claim 1, wherein the optical member has a reflected light releasing face formed so as to cause the reflected light directed toward the imaging mechanism to be incident thereon in a direction normal to the reflected light releasing face.

12. An imaging device according to claim 11, wherein the reflected light releasing face is a part of a surface of a circle having, as the center, a focal point at which the reflected light is converged.

13. A method for producing an imaging device according to claim 1, the method comprising the steps of:

causing the optical member to be in close-contact with the convex mirror so that the optical member covers the convex mirror; and attaching the imaging mechanism to the optical member so that the reflected light is incident on the imaging mechanism.

14. An imaging device, comprising:

a convex mirror for reflecting incident light representing an object, the convex mirror having a shape of solid of revolution;

an imaging mechanism for taking an image represented by reflected light from the convex mirror, the imaging mechanism including a lens for converging the reflected light and an imaging section for taking an image represented by the reflected light converged by the lens, wherein the lens is integrally formed with the optical member; and an optical member for guiding the incident light toward the convex mirror and guiding the reflected light toward the imaging mechanism, the optical member being in close-contact with the convex mirror.

15. An imaging device according to claim 14, wherein the optical member has a concave portion which is in close-contact with the convex mirror so as to cover the convex mirror.

16. An imaging device according to claim 15, wherein the convex mirror is formed of a thin layer of a material having a mirror-surface effect, the thin layer being provided on the concave portion.

17. An imaging device according to claim 14, wherein the imaging mechanism includes a lens for converging the reflected light, and an imaging section for taking an image represented by the reflected light converged by the lens; and the lens is in close-contact with the optical member.

18. An imaging device according to claim 17, wherein the optical member has a refractive index which is smaller than the refractive index of the lens.

19. An imaging device according to claim 14, wherein the optical member has an outer circumferential surface formed so as to cause the incident light to be incident thereon in a direction normal to the outer circumferential surface.

20. An imaging device according to claim 14, wherein the optical member has a reflected light releasing face formed so as to cause the reflected light directed toward the imaging mechanism to be incident thereon in a direction normal to the reflected light releasing face.

21. An imaging device, comprising:

a convex mirror for reflecting incident light representing an object, the convex mirror having a shape of solid of revolution;

an imaging mechanism for taking an image represented by reflected light from the convex mirror; wherein the imaging mechanism includes a lens for converging the reflected light, an optical member for guiding the incident light toward the convex mirror and guiding the reflected light toward the imaging mechanism, the optical member being in contact with and holding both of the convex mirror and the imaging mechanism disposed on the opposite side to the convex mirror with the optical member interposed therebetween, wherein the imaging mechanism further comprises an imaging section for taking an image represented by the reflected light converged by the lens that has a diameter that is smaller than a diameter of a reflected light releasing face of the optical member and the lens is integrally formed with the optical member.

22. An imaging device according to claim 21, wherein the optical member has a concave portion which is in close-contact with the convex mirror so as to cover the convex mirror.

23. An imaging device according to claim 22, wherein the convex mirror is formed of a thin layer of a material having a mirror-surface effect, the thin layer being provided on the concave portion.

24. An imaging device according to claim 21, wherein the optical member has a plane for releasing the reflected light, and the plane has a flat surface or a curved surface projecting towards the convex mirror.

25. An imaging device according to claim 21, wherein the imaging mechanism includes a lens for converging the reflected light, and an imaging section for taking an image represented by the reflected light converged by the lens; and the lens is in close-contact with the optical member.

26. An imaging device according to claim 25, wherein the optical member has a refractive index which is smaller than the refractive index of the lens.

27. An imaging device according to claim 21, wherein the optical member has an outer circumferential surface formed so as to cause the incident light to be incident thereon in a direction normal to the outer circumferential surface.

28. An imaging device according to claim 21, wherein the optical member has a reflected light releasing face formed so as to cause the reflected light directed toward the imaging mechanism to be incident thereon in a direction normal to the reflected light releasing face.

29. An imaging device according to claim 28 wherein the reflected light releasing face is a part of a surface of a circle having, as the center, a focal point at which the reflected light is converged.

* * * * *